United States Patent
Panshin et al.

(10) Patent No.: US 9,707,783 B2
(45) Date of Patent: Jul. 18, 2017

(54) REPLACEABLE PRINTER COMPONENT INCLUDING A MEMORY STORING A TAG ENCRYPTION MASK

(75) Inventors: Stephen D. Panshin, Corvallis, OR (US); Jefferson P. Ward, Brush Prairie, WA (US); David B. Novak, Philomath, OR (US); Glenn D. McCloy, Corvallis, OR (US); Brian L. Helterline, Salem, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 574 days.

(21) Appl. No.: 12/994,756

(22) PCT Filed: May 29, 2008

(86) PCT No.: PCT/US2008/065108
§ 371 (c)(1),
(2), (4) Date: Feb. 24, 2011

(87) PCT Pub. No.: WO2009/145775
PCT Pub. Date: Dec. 3, 2009

(65) Prior Publication Data
US 2011/0176175 A1    Jul. 21, 2011

(51) Int. Cl.
*G06F 21/60* (2013.01)
*B41J 29/38* (2006.01)
(Continued)

(52) U.S. Cl.
CPC ........... *B41J 29/38* (2013.01); *B41J 2/17546* (2013.01); *G03G 15/0863* (2013.01);
(Continued)

(58) Field of Classification Search
CPC ..... B41J 29/38; G06F 21/602; H04L 2209/04
(Continued)

(56) References Cited

U.S. PATENT DOCUMENTS 4,961,088 A    10/1990    Gilliland et al.
5,610,635 A    3/1997    Murray et al.
(Continued)

FOREIGN PATENT DOCUMENTS

CN    1452840 A    10/2003
GB    2354735 A    4/2001
(Continued)

OTHER PUBLICATIONS

Extended European Search Report dated Apr. 8, 2013 issued on EP Patent Application No. 08756447.2 filed at the European Patent Office.
(Continued)

*Primary Examiner* — Kent Yip
(74) *Attorney, Agent, or Firm* — Dicke, Billig & Czaja, PLLC

(57) ABSTRACT

A replaceable printer component includes a memory and a communication link. The memory stores a tag encryption mask and data. The data is stored in a plurality of portions of the memory where each portion is defined by a tag. The tag encryption mask indicates an encryption status of each portion of the memory defined by a tag. The communication link is configured to communicatively link the memory to a printer controller when the replaceable printer component is installed in a printing system.

9 Claims, 3 Drawing Sheets

(51) Int. Cl.
*B41J 2/175* (2006.01)
*G06F 21/79* (2013.01)
*G03G 15/08* (2006.01)

(52) U.S. Cl.
CPC ............ *G06F 21/602* (2013.01); *G06F 21/79* (2013.01); *G03G 2215/0697* (2013.01); *G03G 2221/1823* (2013.01); *H04L 2209/04* (2013.01)

(58) Field of Classification Search
USPC ................................................ 358/1.14–1.16
See application file for complete search history.

(56) References Cited

U.S. PATENT DOCUMENTS

| | | |
|---|---|---|
| 5,699,091 A | 12/1997 | Bullock et al. |
| 5,812,156 A | 9/1998 | Bullock et al. |
| 5,835,817 A | 11/1998 | Bullock et al. |
| 6,019,461 A | 2/2000 | Yoshimura et al. |
| 6,039,430 A | 3/2000 | Helterline et al. |
| 6,126,265 A | 10/2000 | Childers et al. |
| 6,264,301 B1 | 7/2001 | Helterline et al. |
| 6,459,860 B1 | 10/2002 | Childers |
| 6,488,352 B1 | 12/2002 | Helterline et al. |
| 6,722,753 B2 | 4/2004 | Helterline et al. |
| 6,738,903 B1* | 5/2004 | Haines .......................... 713/168 |
| 6,817,693 B2 | 11/2004 | Phillips et al. |
| 7,278,031 B1* | 10/2007 | Best ........................ A63F 13/10 713/191 |
| 7,360,131 B2 | 4/2008 | Walmsley |
| 2002/0090086 A1* | 7/2002 | Van Rijnsoever ............ 380/207 |
| 2002/0122671 A1* | 9/2002 | Yoshimura ...................... 399/12 |
| 2003/0231767 A1* | 12/2003 | Carbajal ....................... 380/200 |
| 2004/0039908 A1* | 2/2004 | Rose .................... H04L 9/0637 713/168 |
| 2007/0211292 A1 | 9/2007 | Walmsley |
| 2008/0040284 A1 | 2/2008 | Hazel et al. |

FOREIGN PATENT DOCUMENTS

| | | |
|---|---|---|
| JP | 2002337419 A | 11/2002 |
| JP | 2002366008 A | 12/2002 |
| TW | 200818796 A | 4/2008 |
| TW | 200746637 | 11/2013 |

OTHER PUBLICATIONS

Chinese Search Report dated May 10, 2013 issued on CN Patent Application No. 200880130571.X.

* cited by examiner

REPLACEABLE PRINTER COMPONENT INCLUDING A MEMORY STORING A TAG ENCRYPTION MASK

RELATED APPLICATIONS

The present application claims the priority under 35 U.S.C. 119(a)-(d) or (f) and under C.F.R. 1.55(a) of previous International Patent Application No.: PCT/US2008/065108, filed May 29, 2008, entitled "Replaceable Printer Component Including a Memory Storing a Tag Encryption Mask", which application is incorporated herein by reference in its entirety.

BACKGROUND

Current printing systems typically include one or more replaceable printer components, such as inkjet cartridges, inkjet printhead assemblies, toner cartridges, ink supplies, etc. Some existing systems provide these replaceable printer components with on-board memory to communicate information to a printer about the replaceable component, such as ink fill level, marketing information, etc.

Some of the information stored within the on-board memory may be proprietary to the manufacturer of the replaceable printer component. The information stored within the on-board memory should be protected from viewing or unauthorized modifications. In addition, it may be useful for some of the information stored within the on-board memory to be protected from viewing by an eavesdropper when the information is transferred between the on-board memory and a host. Further, the information encrypted and the location of the encrypted information within the on-board memory may change over the lifetime of a printer in which the replaceable printer component will be used.

For these and other reasons, a need exists for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
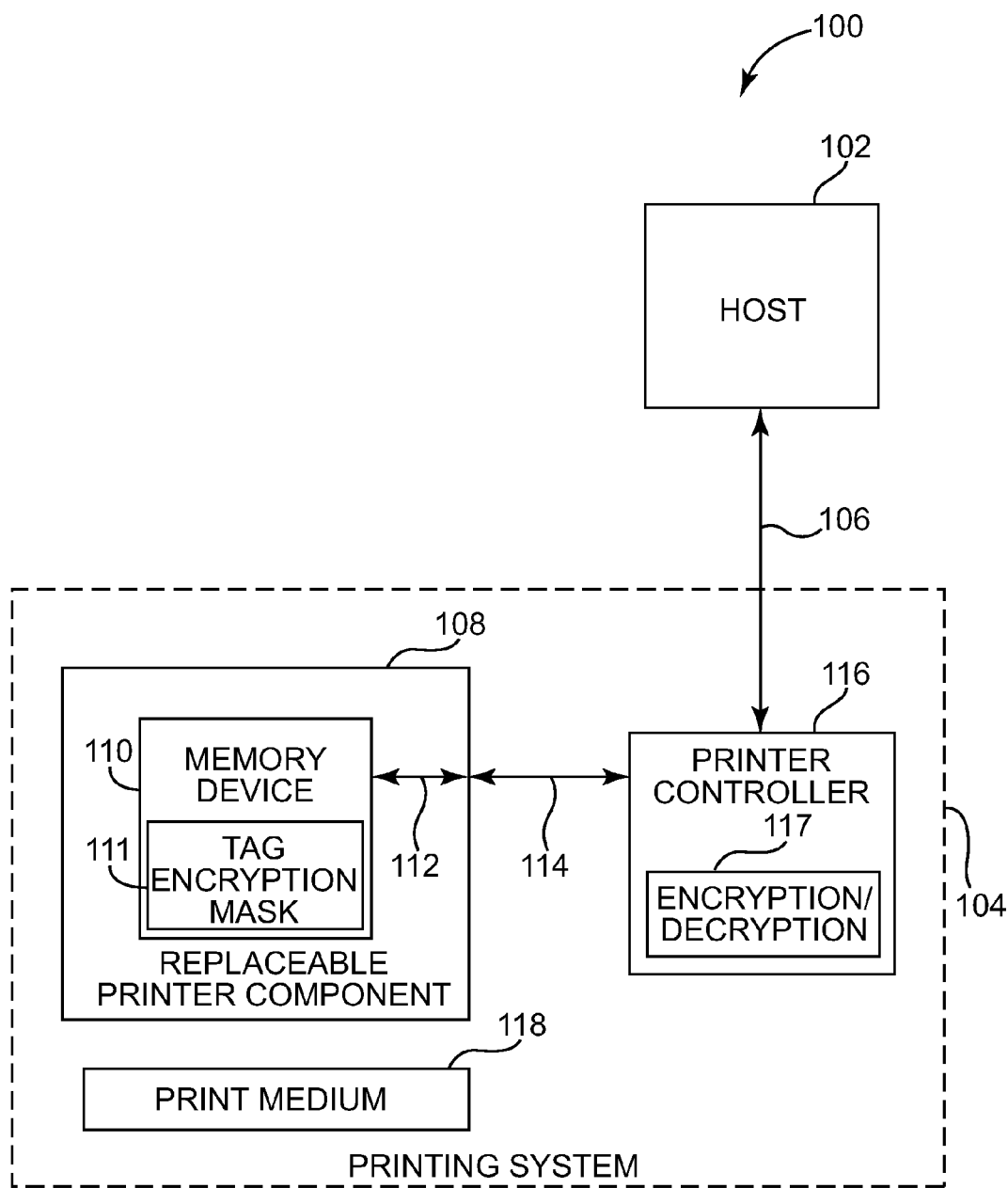
FIG. 1 is a block diagram illustrating one embodiment of a printing arrangement.

FIG. 1 is a block diagram illustrating one embodiment of a printing arrangement 100. Printing arrangement 100 includes a host 102 and a printing system 104. Printing system 104 facilitates printing of graphical and/or textural images on a print medium 118, such as paper, card stock, transparencies, Mylar, cloth, and the like. Printing system 104 includes, for example, an inkjet printer, a laser printer, or other suitable printer. Host 102 communicates with printing system 104 and provides data and/or control signals to printing system 104. Host 102 can be or can be included in a variety of information sources such as a computer, appliance, or other suitable device such as a personal digital assistant (PDA), digital camera, cellular phone, etc.

In one embodiment, printing system 104 includes a printer controller 116 and a replaceable printer component 108. Replaceable printer component 108 includes a memory device 110. In one embodiment, memory device 110 stores a tag encryption mask 111 in a header area of the memory. Tags defining data and the data defined by the tags are stored in memory device 110 in a data area of the memory. The data defined by each tag can be either encrypted or unencrypted. Tag encryption mask 111 indicates the encryption status of the data defined by each tag stored in memory device 110 by indicating whether the data is encrypted or unencrypted.

Printer controller 116 controls the operation of printing system 104 and, as such, receives data and/or control signals from host 102. Printer controller 116 communicates with host 102 via a communication link 106. Communication link 106 includes, for example, an electrical, optical, infrared, or other suitable information transfer path between printer controller 116 and host 102.

Replaceable printer component 108 includes a component of printing system 104 that is insertable in and removable from printing system 104. In one embodiment, replaceable printer component 108 includes a consumable component that is disposed of and replaced at an end of a useful life thereof. An example of such a consumable component includes an ink container or a toner cartridge that contains a supply of marking material for printing system 104. The marking material is deposited on print medium 118 by printing system 104 and depleted during a useful life of the ink container or toner cartridge. As such, the ink container or toner cartridge is disposed of and replaced at an end of a useful life thereof or is remanufactured and reused.

In another embodiment, replaceable printer component 108 includes a printing component that is readily replaced in printing system 104. Examples of such a printing component include a printhead that selectively deposits ink on print medium 118 in response to control signals from printer controller 116 or a printer cartridge that includes a printhead and an ink supply. Thus, replaceable printer component 108 may include an ink container, a printhead, or a printer cartridge if, for example, printing system 104 includes an inkjet printer. In addition, replaceable printer component 108 may include a toner cartridge or a developer drum if, for example, printing system 104 includes a laser printer. Further, replaceable printer component 108 may include a peripheral device of printing system 104, such as an Ethernet card, a duplexer, a paper finisher (e.g., stapler, hole punch, etc.), or another suitable device.

Printer controller 116 and replaceable printer component 108 communicate with each other via a communication link 114. Communication link 114 facilitates information transfer between printer controller 116 and replaceable printer component 108 when replaceable printer component 108 is installed in printing system 104. Communication link 114 includes, for example, an electrical, optical, infrared, or other suitable information transfer path between replaceable printer component 108 and printer controller 116.

Replaceable printer component 108 includes a memory device 110 that stores information for replaceable printer component 108 and/or printing system 104. In one embodiment, memory device 110 includes a 256-byte or another suitably sized non-volatile memory, such as an EEPROM, FLASH, or another suitable memory. In one embodiment, memory device 110 stores, for example, information that is specific to replaceable printer component 108 and/or information that is applicable to printing system 104. In addition, memory device 110 can have information to be used by printing system 104 stored therein or can record information for printing system 104. In one embodiment, information that may be stored in memory device 110 includes operational and/or non-operational parameters for replaceable printer component 108 and/or printing system 104.

In one embodiment, replaceable printer component 108 includes a communication link 112 that electrically couples or communicatively couples memory device 110 with communication link 114 and, therefore, with printer controller 116 when replaceable printer component 108 is installed in printing system 104. As such, when replaceable printer component 108 is installed in printing system 104, memory device 110 communicates with printer controller 116 via communication links 112 and 114. Thus, communication links 112 and 114 include, for example, electrical couplings or connections such as electrical contacts or pins that mate with corresponding electrical nodes or receptacles, respectively.

Printer controller 116 includes an encryption/decryption circuit, logic, or algorithm 117. With replaceable printer component 108 installed in printing system 104, printer controller 116 reads the information stored in memory device 110 including tag encryption mask 111, the tags, and the data defined by the tags. Encryption/decryption algorithm 117 then decrypts the data defined by each tag where tag encryption mask 111 indicates that the data defined by a tag is encrypted. Therefore, some blocks of the data stored in memory device 110 may be encrypted while other blocks of the data stored in memory device 110 may be left unencrypted. When printer controller 116 writes data to memory device 110, encryption/decryption algorithm 117 first encrypts the data defined by each tag where tag encryption mask 111 indicates that the data defined by a tag is encrypted. The encrypted data is then written to memory device 110.

Tag encryption mask 111 enables any selected portions or blocks of memory device 110 to be encrypted by the manufacturer or other authorized user of replaceable printer component 108 without printing system 104 being previously programmed to recognize certain portions or blocks of memory device 110 as storing encrypted data. Thus, the data encrypted and the location of the encrypted data stored in memory device 110 of replaceable printer component 108 may vary over the lifetime of printing system 104.

Figure 2:
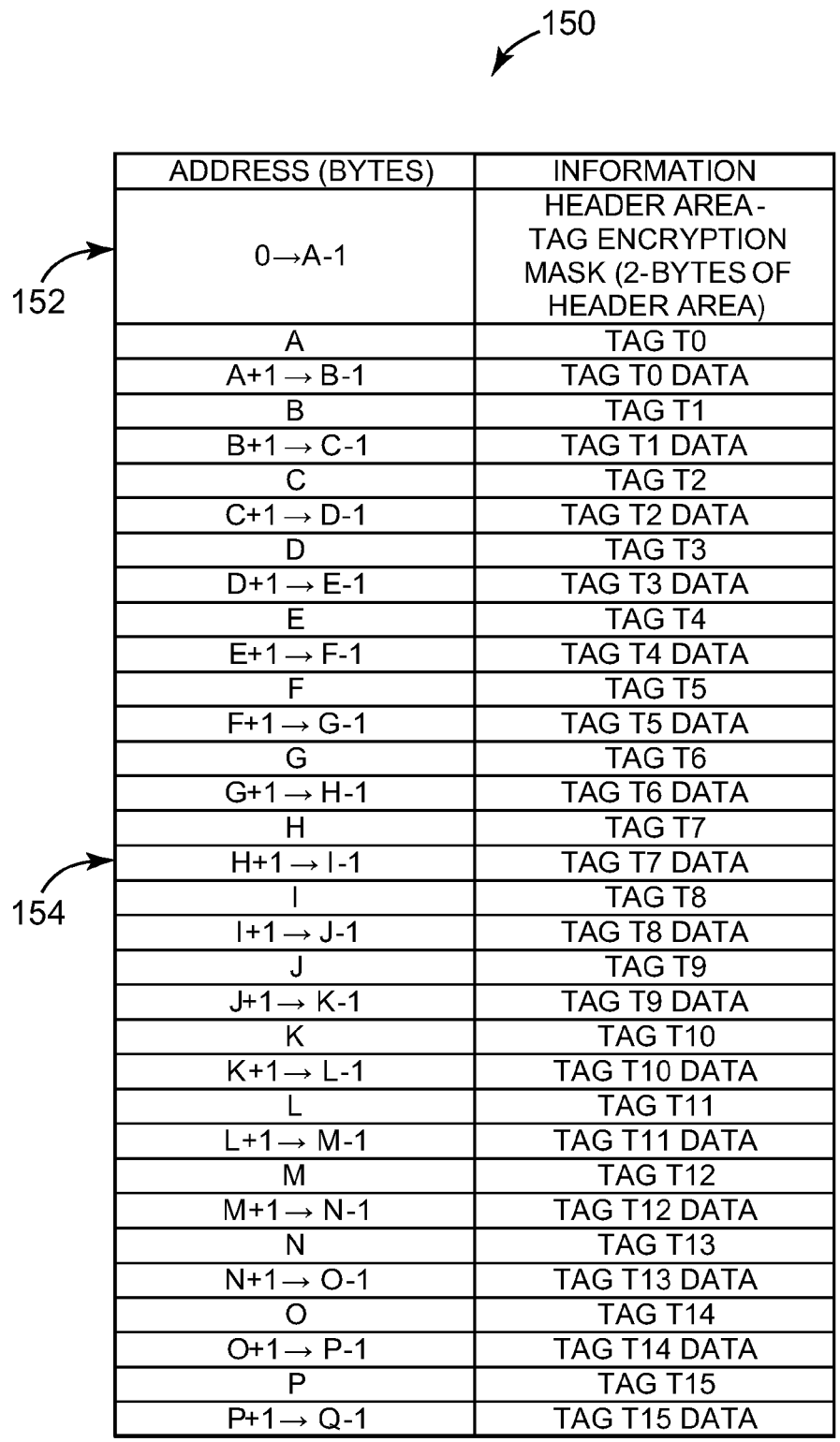
FIG. 2 is a table illustrating one embodiment of the format of information stored within a memory device of a replaceable printer component.

FIG. 2 is a table illustrating one embodiment of a format 150 of information stored within memory device 110 of a replaceable printer component 108. Memory device 110 includes a header area as indicated at 152 and a data area as indicated at 154. Header area 152 begins at address 0 and ends at address "A−1", where "A" is an integer number of bytes of memory device 110. In one embodiment, header area 152 is not encrypted. Header area 152 includes tag encryption mask 111. In one embodiment, tag encryption mask 111 includes 2-bytes (16-bits) of memory device 110.

In one embodiment, data area 154 includes 16 portions or blocks of memory device 110. In other embodiments, data area 154 includes fewer than 16 portions or blocks. Each of the 16 blocks includes a tag as indicated by "T0" to "T15" and tag data. For each block, the tag is stored in memory device 110 directly preceding the tag data. In one embodiment, the tags are not encrypted. Each tag defines a tag identity and the length of the tag data. The tag identity identifies the type of data stored in the following block of memory device 110. From the length of the tag data, the address range for the block is determined. The address range for each block is defined by "A" to "Q", where each letter "A" to "Q" is an integer number of bytes of memory device 110. For example, tag "T0" defines the type of data stored in address range "A+1" to "B−1". Tag "T1" defines the type of data stored in address range "B+1" to "C−1". Likewise, tag "T15" defines the type of data stored in address range "P+1" to "Q−1". The tags can be stored in any order within data area 154. In addition, the included tag identities do not need to form a contiguous range. For example, in one embodiment, data area 154 includes six blocks storing data defined by the following tags in the given order: "T3", "T1", "T4", "T5", "T6", and "T10". The type of data and the length of the data defined by each tag can vary between each tag "T0" to "T15". For example, the length of tag "T0" data may equal 12-bytes, the length of tag "T1" data may equal 32-bytes, the length of tag "T2" data may equal 44-bytes, etc.

Each respective bit of tag encryption mask 111 indicates whether the tag data defined by each respective tag is encrypted or unencrypted. The first bit of tag encryption mask 111 indicates whether the data defined by tag "T0" is encrypted or unencrypted. The second bit of tag encryption mask 111 indicates whether the data defined by tag "T1" is encrypted or unencrypted. Likewise, the 16th bit of tag encryption mask 111 indicates whether the data defined by tag "T15" is encrypted or unencrypted.

In one embodiment, a logic "0" bit within tag encryption mask 111 indicates the data defined by the corresponding tag is unencrypted and a logic "1" bit within tag encryption mask 111 indicates the data defined by the corresponding tag is encrypted. In another embodiment, a logic "1" bit within tag encryption mask 111 indicates the data defined by the corresponding tag is unencrypted and a logic "0" bit within tag encryption mask 111 indicates the data defined by the corresponding tag is encrypted. For example, in one embodiment where a logic "1" indicates encrypted data, a tag encryption mask equal to "0010-0000-0100-0001" indicates that the data defined by tags "T13", "T6", and "T0" is encrypted, and the data defined by the remaining tags is unencrypted. In other embodiments, a different number of tags and a corresponding different length tag encryption mask 111 are used, such as 32 tags and a corresponding 32-bit tag encryption mask.

Figure 3:
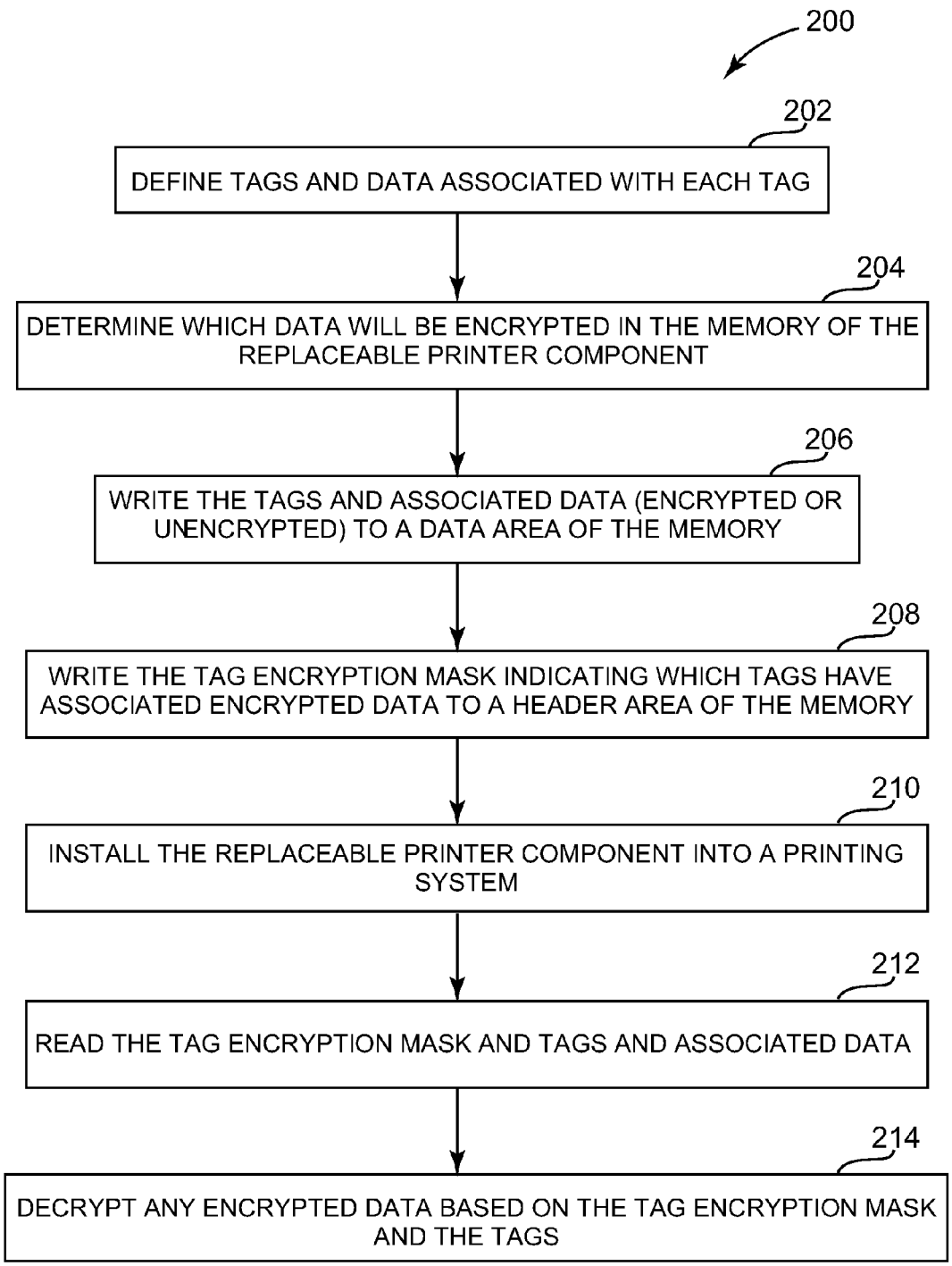
FIG. 3 is a flow diagram illustrating one embodiment of a method for using a memory device of a replaceable printer component.

FIG. 3 is a flow diagram illustrating one embodiment of a method 200 for using memory device 110 of replaceable printer component 108. At 202, the tags and the data associated with each tag are defined. Each tag defines the type of data to be stored following the tag and the length of the data. At 204, the data to be encrypted in memory device 110 of replaceable printer component 108 is identified. At 206, the identified data is encrypted and the tags and the data defined by the tags are written to the data area of memory device 110. At 208, the tag encryption mask indicating which data is encrypted and which data is unencrypted is written to the header area of memory device 110. In one embodiment, the previous process described by blocks 202 through 208 is performed by the manufacturer of replaceable printer component 108 during the manufacturing process of replaceable printer component 108.

At 210, a user installs replaceable printer component 108 into a printing system 104. With replaceable printer component 108 installed in a printing system 104, printer controller 116 establishes communications with memory device 108 through communication links 112 and 114. At 212, printer controller 116 reads memory device 110 including the tag encryption mask and the tags and data defined by the tags. At 214, encryption/decryption algorithm 117 of printer controller 116 decrypts any encrypted data read from memory device 110 as indicated by the tag encryption mask. When printer controller 116 writes data to memory device 110, encryption/decryption algorithm 117 first encrypts any data to be written to an encrypted portion of memory device 110 as indicated by the tag encryption mask.

Embodiments provide a replaceable printer component including a memory device. Memory device embodiments store a tag encryption mask indicating which portions of the memory device are storing encrypted data and which portions of the memory device are storing unencrypted data. A printing system in which a replaceable printer component embodiment is installed decrypts the encrypted data based on the tag encryption mask during read operations. In addition, the printing system in which the replaceable printer component embodiment is installed encrypts data based on the tag encryption mask during write operations. Therefore, in embodiments, the data encrypted and the location of the encrypted data stored in the memory device of the replaceable printer component may vary over the lifetime of the printing system.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A non-transient data storage device for a replaceable printer component, storing:
    data in a plurality of tags and a plurality of data blocks, each tag identifying a length of a corresponding data block, and
    a tag encryption mask that indicates an encryption status of each data block of the plurality of data blocks; and
    a communication link comprising electrical contacts to link the data storage device to a printer controller of a printing system when the replaceable printer component is installed in the printing system;
    wherein:
        the tag encryption mask indicates the encryption status of each data block by associating each encryption status to each respective tag of each data block, and
        the encryption status indicates to the printer controller that reads the encryption mask whether the respective data block is encrypted or unencrypted for decrypting a data block indicated as encrypted and not decrypting a data block indicated as unencrypted for reading the contents of the data blocks.

2. The non-transient data storage device of claim 1, wherein the encryption status indicates to a printer controller that reads the encryption mask whether the respective data block is to be encrypted or unencrypted for writing the data blocks to the data area.

3. The non-transient data storage device of claim 1, wherein the encryption status of a respective one of the data blocks corresponds to the encryption status as indicated in the tag encryption mask.

4. The non-transient data storage device of claim 1, wherein each tag precedes a corresponding one of the data blocks, the corresponding one of the data blocks directly following its respective tag.

5. The non-transient data storage device of claim 1, wherein at least two data blocks of the plurality of data blocks comprise a different length.

6. The non-transient data storage device of claim 1, wherein the tag encryption mask indicates an encryption status of each data block by referring to the tags.

7. The non-transient data storage device of claim 1, wherein the tag encryption mask identifies which of the data is to be encrypted by the printer controller based on the tag encryption mask.

8. The non-transient data storage device of claim 1, wherein each bit of the tag encryption mask indicates the encryption status of the respective data block.

9. The non-transient data storage device of claim 8, wherein a logic "0" bit indicates unencrypted data and a logic "1" bit indicates encrypted data.

* * * * *

UNITED STATES PATENT AND TRADEMARK OFFICE
CERTIFICATE OF CORRECTION

PATENT NO. : 9,707,783 B2  
APPLICATION NO. : 12/994756  
DATED : July 18, 2017  
INVENTOR(S) : Stephen D. Panshin et al.

Page 1 of 1

It is certified that error appears in the above-identified patent and that said Letters Patent is hereby corrected as shown below:

In Column 6, Line 5, in Claim 1, delete "Anon-transient" and insert -- A non-transient --, therefor.

Signed and Sealed this
Twenty-sixth Day of May, 2020

Andrei Iancu
*Director of the United States Patent and Trademark Office*